(12) United States Patent
Bhatia et al.

(10) Patent No.: US 8,245,223 B2
(45) Date of Patent: Aug. 14, 2012

(54) NETWORKED DEPLOYMENT OF MULTI-APPLICATION CUSTOMIZATIONS

(75) Inventors: Saurabh Bhatia, Bellevue, WA (US);
Konstantin Erman, Kirkland, WA (US);
Jeffrey Scott Young, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 12/342,169

(22) Filed: Dec. 23, 2008

(65) Prior Publication Data

US 2010/0162232 A1 Jun. 24, 2010

(51) Int. Cl.
*G06F 9/445* (2006.01)
(52) U.S. Cl. ............................. 717/174; 717/168
(58) Field of Classification Search .................. 717/168, 717/174
See application file for complete search history.

(56) References Cited

U.S. PATENT DOCUMENTS

| | | | |
|---|---|---|---|
| 6,557,054 B2 * | 4/2003 | Reisman | 710/33 |
| 6,742,028 B1 * | 5/2004 | Wang et al. | 709/223 |
| 7,069,553 B2 * | 6/2006 | Narayanaswamy et al. | 717/173 |
| 7,181,731 B2 * | 2/2007 | Pace et al. | 717/136 |
| 7,277,018 B2 * | 10/2007 | Reyes et al. | 340/573.1 |
| 7,389,355 B2 | 6/2008 | Brown et al. | |
| 7,620,630 B2 * | 11/2009 | Lloyd et al. | 1/1 |
| 7,802,246 B1 * | 9/2010 | Kennedy et al. | 717/173 |
| 8,019,737 B2 * | 9/2011 | Kocsis et al. | 707/694 |
| 8,024,399 B2 * | 9/2011 | Reisman | 709/203 |
| 2007/0061428 A1 | 3/2007 | Haley et al. | |
| 2008/0098099 A1 | 4/2008 | Khasnis et al. | |
| 2008/0201707 A1 | 8/2008 | Lavery et al. | |

OTHER PUBLICATIONS

"Deploy and Update your Smart Client Projects using a Central Server", Retrieved at<<http://msdn.microsoft.com/en-us/magazine/cc163973.aspx>>, Oct. 29, 2008, pp. 1-7.
"Creating ClickOnce Applications for others to Deploy", Retrieved at<<http://msdn.microsoft.com/en-us/ library/bb384248.aspx>>, Nov. 2007, pp. 1-4.
Kumar Arun, "Application Development Using ClickOnce in Visual Studio 2005", Retrieved at<<http://www.c-sharpcorner.com/UploadFile/arun 777/10812200 5054109AM/1.aspx?ArticleID=c52ed11b-29d3- 4b49-b59b-be 17b53a6e7a>>, Aug. 12, 2005, pp. 1-11.
"ClickOnce Deployment with VS 2005", Retrieved at<<http://microsotapress.com/index.php?id=65>>, Oct. 29, 2008, pp. 1-16.

* cited by examiner

*Primary Examiner* — Isaac Tecklu
*Assistant Examiner* — Mohammad Kabir
(74) *Attorney, Agent, or Firm* — Ogilvie Law Firm

(57) ABSTRACT

A user node receives a multi-project solution which includes customizations that collectively extend installed applications. The customizations are installed on the user node as a single solution from an end-user perspective, e.g., by displaying a single progress update bar, displaying a single entry for the multi-project solution in an add/remove programs control, and making a single trust decision for the multi-project solution, as opposed to individual displays and individual trust decisions for each customization. Deployment may invoke an enhanced application manifest, an enhanced deployment manifest, or both.

20 Claims, 3 Drawing Sheets

NETWORKED DEPLOYMENT OF MULTI-APPLICATION CUSTOMIZATIONS

BACKGROUND

Some computer networks are configured to support automated deployment of software. For instance, in some web-based deployment systems, when a user working at a networked machine selects a particular icon or a particular URL (Universal Resource Locator), software is automatically downloaded to the user's machine from another machine in the network. The downloaded software may then be installed on the user's machine and run. Installation may place the downloaded software in a temporary location, such as a browser or virtual machine "sandbox" which limits the downloaded software's access to files, for example, as a security measure. Installation may also place downloaded software in a more permanent location such as a local hard drive, where the downloaded software receives security treatment equal to the treatment of software that is installed directly on the user's machine from a CD or DVD, for example. The downloaded software may be a complete application program, for example, or updates which replace some but not all previously installed baseline components of an application program, or a customization of a previously installed application which adds functionality without replacing or modifying the application's baseline components.

SUMMARY

Some software solutions discussed herein customize multiple previously installed applications. For example, a spreadsheet application customization and an email application customization may operate as two aspects of a single solution, which updates a spreadsheet using information obtained by email from people in different countries. Such solutions, which include interdependent customizations of multiple applications, are an example of a "multi-application customization". Some embodiments discussed herein facilitate networked deployment of multi-application customizations.

With some embodiments, a user at a user node makes a request to run a solution. In response, the user node receives, from a remote node of the computer network, a multi-application customization which includes a plurality of customizations that collectively extend a plurality of applications. The customizations form a single solution when viewed from an end-user perspective. For instance, the user node may display a single progress update bar for the multi-application customization in response to the user request, as opposed to displaying individual progress bars for each customization. The user node may display a single entry for the multi-application customization in a control for adding and removing programs, as opposed to displaying individual entries for each customization. Similarly, a security control of the user node may make a single trust decision regarding the multi-application customization, as opposed to making individual trust decisions for each customization. The user node runs the previously installed applications with their customizations, to provide the user with the requested solution. In some embodiments, the user request invokes an enhanced application manifest, which contains multiple entry points corresponding to respective multiple customizations of the multi-application customization. In some embodiments, the user request invokes an enhanced deployment manifest, which identifies multiple application manifests that each have a respective entry point for one of the customizations of the multi-application customization.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
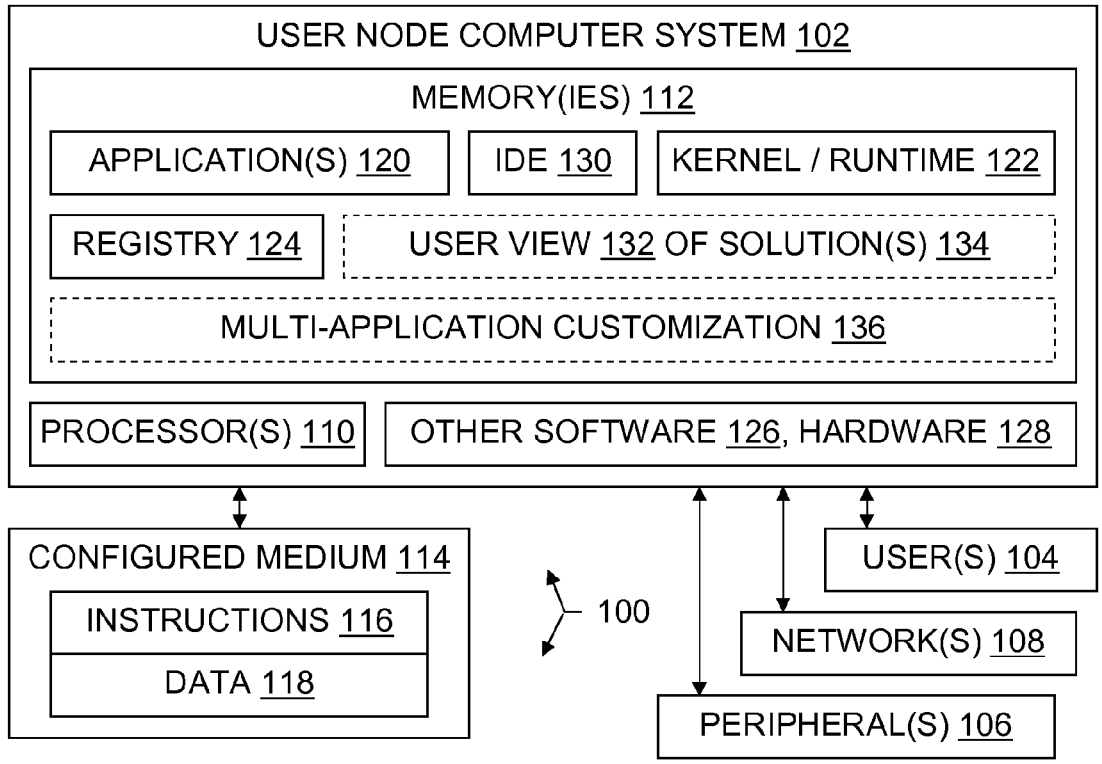
FIG. 1 is a block diagram illustrating a computer system having a processor, a memory, at least one application program, and other items in an operating environment, and also illustrating configured storage medium embodiments.
Figure 2:
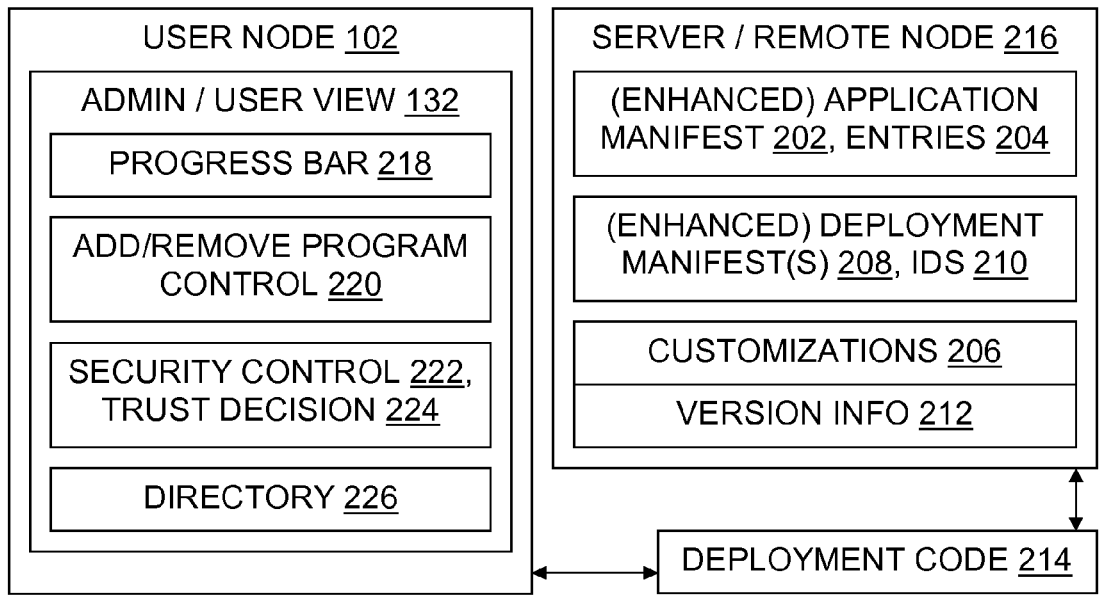
FIG. 2 is a block diagram illustrating computer systems in a network configured for multi-application customization deployment.

Microsoft ClickOnce™ deployment technology allows developers to create self-updating Microsoft Windows®-based applications that can be installed and run with little user effort, such as Managed Applications built using the Microsoft .NET™ Framework. Application updates can be provided automatically. Applications are deployed as self-contained items that do not share application-specific components with other applications, and can be installed by non-administrative users. A customization for an application, also known as an "add-in", can also be deployed and/or updated using ClickOnce™ deployment technology. Add-ins require a host application. That is, customizations do not run on their own separately from a host application.

However, in Microsoft Visual Studio® 2008, Visual Studio Tools for Office ("VSTO") customizations are deployed as individually packaged solutions. Only one add-in or one document level solution can be present in a given standard ClickOnce™ deployment package.

Some embodiments described herein allow a complex Office Business Application ("OBA") solution to include multiple VSTO customizations. A developer can package and deploy such a solution as a unit, so the constituent customizations are installed/uninstalled and updated together. Such a solution could include multiple document and/or add-in solutions for the same applications, or for different applications. While these customizations are programmatically separate individual VSTO solutions, they can work together to enable a particular set of scenarios for the end user. The customizations are conceptually bundled together, so end users can interact with them collectively, as one individual solution, when installing, updating, or uninstalling one or more of the customizations.

In some embodiments, a multi-project deployment feature allows developers to package multiple VSTO solutions in one deployment package. For example, some embodiments use only one deployment manifest and only one application manifest to contain all necessary information for multiple add-ins to be installed. In some embodiments, a user can install a multi-application customization (also referred to herein as a "multi-project solution") by double clicking the deployment manifest (.vsto file). Alternately, a setup.exe bootstrapper will install all VSTO solutions that are defined in a multi-project solution package. Similarly, uninstalling the multi-project solution will uninstall all of its constituent VSTO solutions, that is, its constituent customizations. In some embodiments, only one Add/Remove Programs entry is created for the entire multi-project solution. In some embodiments, all available updates to the customizations of a multi-project solution will be applied at the same time.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on. In particular and without further limitation, a central processing unit (CPU) and a graphics processing unit (GPU) are each an example of a logical processor.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Customization" means an extension to a previously installed application, which does not replace any library or other baseline component of the application but instead adds functionality using additional code. Some examples of customizations include VSTO-based document level solutions, and VSTO add-ins. A document level solution is a VSTO customization that is attached to a specific document. In some embodiments, VSTO supports Microsoft Word™ and Microsoft Excel® document level solutions, for example. "VSTO solution" means a document level solution or an add-in under VSTO. Customizations are not necessarily limited to VSTO solutions.

"Multi-project solution" and "multi-application customization" are used interchangeably to refer to a solution containing multiple customizations that can be deployed as one unit as described herein.

"Deployment manifest" refers to a deployment file for use in networked deployment of applications and/or customizations. Some embodiments use a standard deployment manifest, while others use a deployment manifest format designed specifically for multi-application customization deployment. In some configurations, a deployment manifest is an XML file that describes a ClickOnce™ deployment, including an identification of a current ClickOnce™ application version to deploy, namely, a .vsto file.

"Application manifest" also refers to a deployment file for use in networked deployment of applications and/or customizations; interactions between deployment manifests and application manifests are discussed herein. Some embodiments use a standard application manifest, while others use an application manifest format designed specifically for multi-application customization deployment. In some configurations, an application manifest is an XML file that describes an application that is deployed using ClickOnce™ technology, namely, a manifest file. Within an application manifest, one or more "entry points" identify the assembly(ies) that should be executed when application(s) run on a client computer. Application manifests and deployment manifests are not necessarily limited to ClickOnce™ deployments.

Client computers in a server-client network are an example of a "user node" computer, as are peer nodes in a peer-to-peer network.

Throughout this document, use of the optional plural "(s)" means that one or more of the indicated feature is present. For example, "file(s)" means "one or more files" or equivalently "at least one file".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system; some networked deployment technologies do not require an ongoing or continuous network connection.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110, which may be a CPU or a GPU, for example. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system.

Memories 112 may be of different physical types. Applications 120, a kernel and/or other runtime 122, a software and/or hardware component registry 124, and other items shown in the Figures may reside partially or entirely within one or more memories 112, thereby configuring those memories. An operating environment may also include other software 126, and other hardware 128.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

A given operating environment 100 may include an Integrated Development Environment (IDE) 130 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development.

FIG. 1 also shows in dashed line boxes a user view 132 of available solutions 134, and multi-application customization(s) 136. These items, discussed hereafter, are shown in a dashed outline rather than a solid outline, to indicate that they are not part of the operating environment 100 but may be installed into the operating environment 100.

Systems

Scenarios and other examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

With the foregoing in mind, consider the following scenarios. A developer works at an independent software vendor which is delivering a business application solution for a mid-sized company. The developer has developed three individual add-ins for a word processor application 120, a spreadsheet application 120, and an email application 120, respectively, which collectively connect to a central database and pull sales information into a host application. The developer wants to package the three add-ins together into one install package so that they can be installed/uninstalled and updated as though they were one application, allowing the end users to view these add-ins as one logical application, that is, one solution 134.

Using technology described herein, the developer creates an application manifest 202 that contains entries 204 which reference the multiple add-ins (customizations 206). The developer modifies a deployment manifest 208 to include an ID 210 which points to the new application manifest 202 and provides a product name for the multi-project solution 136, 134, which is the name that will be displayed to an end user 104 when the solution is installing on a user node computer system 102. For example, in an embodiment which includes a Microsoft Visual Studio® Tools for Office runtime 122, the VSTO runtime will read the multiple references present in the multi-project manifests and install all add-ins as one VSTO solution. The developer can deploy the individual add-ins as one solution 134, namely, a multi-application customization 136. In some alternate embodiments, the ID is not in a deployment manifest, and the deployment manifest for a multi-application customization is substantially the same as for a single-application customization. The ID is used in the _AssemblyLocation property of the document or the add-in registry key.

Users in the VSTO environment can install the multi-project solution containing the three add-ins by launching the .vsto file that the developer created, or by launching a setup.exe bootstrapper. All the individual add-ins (customizations 206) are installed as one application from the user's perspective, and in many respects from an administrator's perspective as well. One trust decision trusts the entire multi-project solution, and only one entry is created in the Add/Remove Programs tool, using the (user-friendly) product name defined in the multi-project deployment manifest. In some configurations, if the installation fails in any regard then none of the add-ins are installed. If a user uninstalls the solution, e.g., by using the Add/Remove Programs tool, then all of the add-ins are uninstalled.

Suppose the developer updates the email application add-in code and updates version info 212 in the manifests to refer to the updated version of that customization. In some configurations and some embodiments, even though only the email application add-in has been updated, the other two add-ins in the multi-project solution will also be redeployed. While a runtime is receiving updates on the end user computer system 102, all of the add-ins that belong to the solution will be downloaded and updated at the same time. However, in some embodiments, a runtime will check hashes and/or other version info 212 and then download only files that have changed.

In some configurations and some embodiments, when a multi-project solution is updated all add-ins are updated and kept in lock-step. For instance, one may be unable to have a Word_AddIn customization at version 1 and an Excel_AddIn customization at version 2. This may be difficult to enforce since it is possible to be in the Word™ application running Word_AddIn at version 1 when the Excel® application and the OBA are upgraded to version 2. In some cases, a runtime 122 enforces lock-step updating, while in other cases different enforcement mechanisms are used, such as a developer checking versions and/or having users restart all applications used by a multi-application customization.

Some embodiments provide a user node computer system 102 in a computer network. The user node computer system is configured by multi-application customization deployment code 214 such as a runtime 122. A remote node 216 may also be configured by deployment code 214 such as code for locating and transmitting customizations 206, and manifests. The user node computer system includes a logical processor 110 and a memory 112 in operable communication with the logical processor.

The memory 112 is configured with installed applications 120, such as one or more of the following: a word processing application, a spreadsheet application, an email application, a slide presentation graphics application, a database application, a project management application, an accounts management application, a collaborative workspace application, a graphics visualization application. Microsoft Word™ and Microsoft Excel® applications are merely some of the possible examples of applications 120.

The memory 112 is further configured, after installation of the applications 120, as a result of the user node computer system performing a deployment method with the deployment code 214. In some embodiments, the deployment method includes the user node computer system 102 receiving a single-action user request to run a multi-application customization, such as a user 104 click on an URL or icon representing the multi-application customization. The user node then receives from a server or other remote node 216 of the computer network a multi-application customization 136, which includes customizations 206 that collectively extend previously installed applications 120.

Some embodiments use an enhanced application manifest 202 within, or with, deployment code 214. An enhanced application manifest contains multiple entry points corresponding to respective multiple customizations of the multi-application customization 136. Some use an enhanced deployment manifest 208, namely, a deployment manifest which identifies multiple application manifests 202 (not necessarily enhanced) that each have a respective entry point for one of the customizations of the multi-application customization 136.

The customizations are installed (made executable) on the user node computer system 102 as a single solution 134 when viewed from an end-user 104 perspective. For example, a single progress update bar 218 is displayed for the multi-application customization 136 install, as opposed to displaying individual progress bars for each customization 206. Similarly, a single entry is displayed for the multi-application customization 136 in a control 220 for adding and removing programs, as opposed to displaying individual entries for each customization 206. Likewise, the applicable security control(s) of the user node computer system make a single trust decision 224 for the multi-application customization 136, as opposed to making individual trust decisions for each customization 206. Likewise, all customizations received in response to the single-action user request are stored in a single directory 226 on the user node computer system 102 without using individual respective directories for each customization. Any or all of these features may be present in a given user view 132 of a multi-application customization 136.

Figure 3:
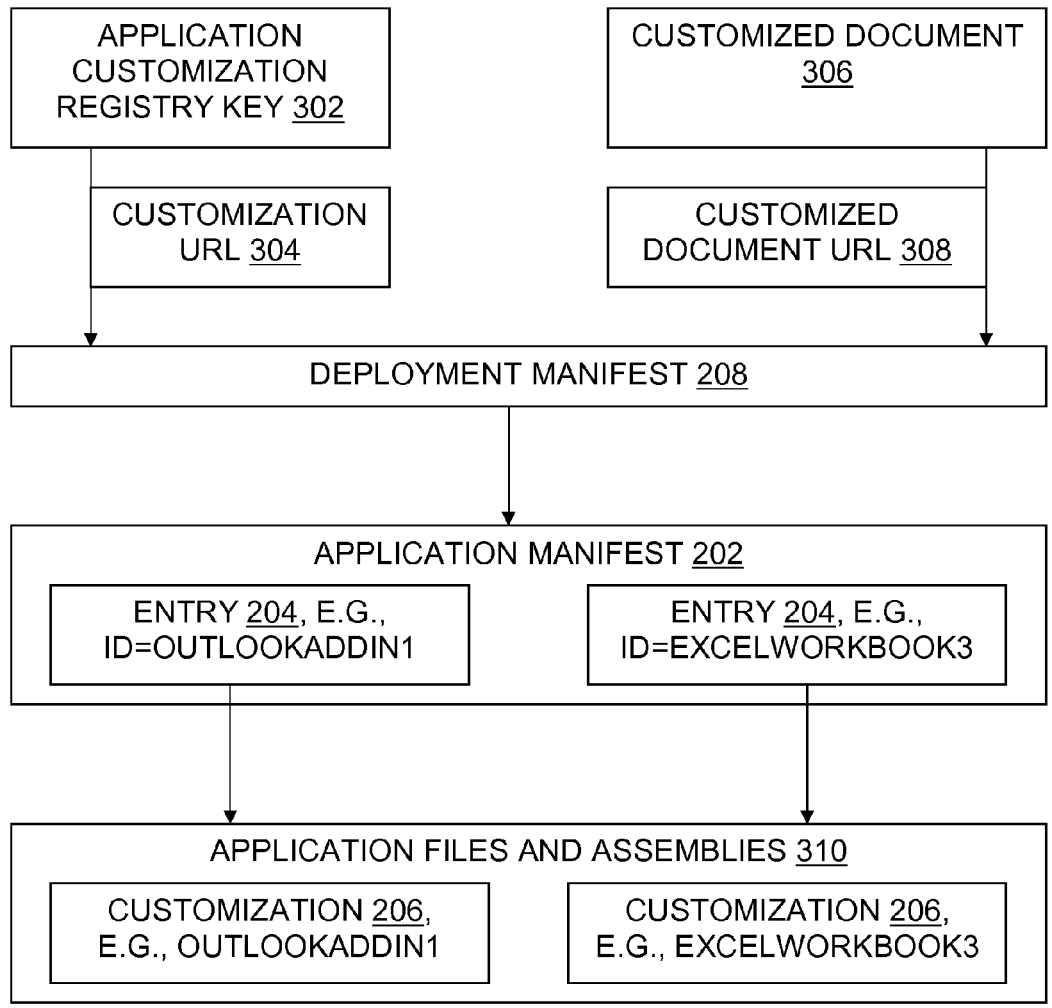
FIG. 3 is a diagram further illustrating an example of multi-application customization deployment.

FIG. 3 further illustrates some embodiments in an example involving VSTO. An application customization registry key 302, such as a Microsoft Office™ add-in registry key, is located in a system registry 124. The registry key 302 contains a customization URL 304 with an add-in identifier, e.g., http://server/deployment.vsto|id=OutlookAddin1

This and other URLs provided herein are merely examples, and are not intended to incorporate by reference any additional material into this document.

Alternatively, or in addition to the customization registry key 302 and customization URL 304, some embodiments include a customized document 306, such as an Excel® spreadsheet, on the user node computer system 102. The customized document 306 contains a customized document URL 308 link to a deployment manifest, e.g., http://server/deployment.vsto|id=ExcelWorkbook3

A given customization URL 304 or customized document URL 308 identifies a deployment manifest 208, such as a .vsto file. In the FIG. 3 example, the deployment manifest 208 is not necessarily an enhanced deployment manifest. The deployment manifest 208 in turn identifies an application manifest 202, such as a manifest file. In the FIG. 3 example, the application manifest 202 is an enhanced application manifest having multiple entries 204. Each entry 204 identifies a respective customization 206, and may also identify other application files and assemblies 310.

Methods

Figure 4:
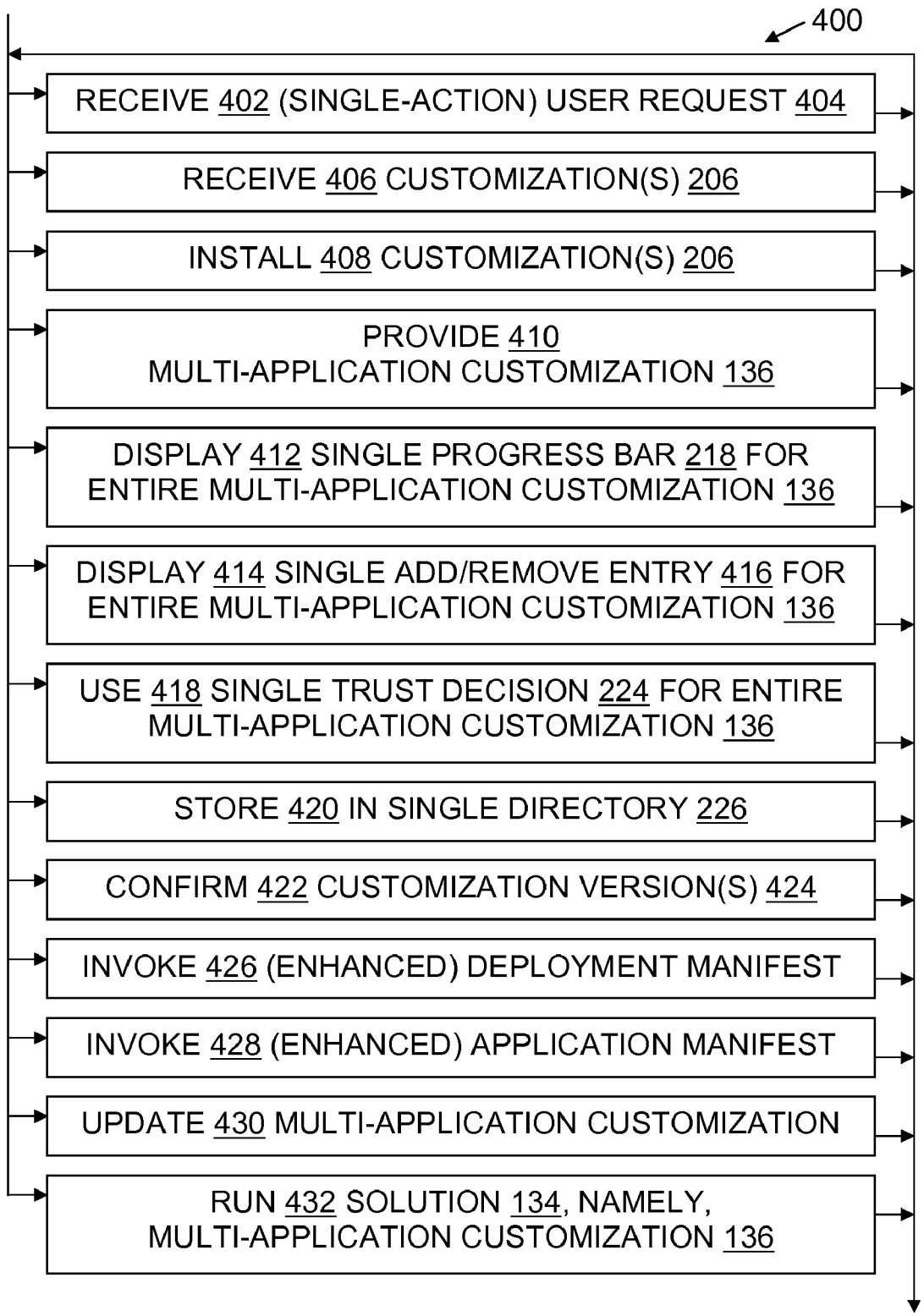
FIG. 4 is a flow chart illustrating steps of some method and configured storage medium embodiments.

FIG. 4 illustrates some method embodiments in a flowchart 400. Methods may be performed in some embodiments automatically, e.g., by deployment code 214, networks 108, and a runtime such as the Microsoft ClickOnce™ runtime 122, under the control of script(s) requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 4. Steps may be performed serially, in a partially overlapping manner, or fully in parallel. The order in which flowchart 400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a user request receiving step 402, an embodiment receives a user request 404 to run a solution 134. For example, a runtime 122 on a user node computer system 102 may receive 402 a request 404 when the user 104 opens a customized document 306, or when a user 104 double-clicks or otherwise selects a customization URL 304 icon, e.g., on a desktop or in a menu listing names of available programs.

During a customization receiving step 406, an embodiment receives at least one customization 206. For example, a user node computer system 102 may receive a customization 206 from a server or other remote node 216 over a network link.

During an installing step 408, an embodiment installs at least one customization 206. For example, a user node computer system 102 may install a customization 206 in part by storing code in a directory 226. Other actions, such as updating/creating a registry 124 key, displaying a progress bar 218, and making a trust decision 224, for example, may also be part of installation 408 in some embodiments in some configurations.

During a providing step 410, an embodiment provides a user 104 with a multi-application customization 136 which is ready to execute on behalf of the user. Providing step 410 may include, for example, receiving 406 customizations and installing 408 them. Other actions, such as checking customization versions, requesting customizations from a remote node 216, and changing the focus of a user interface to display the multi-application customization's opening screen, for example, may also be part of providing step 410 in some embodiments in some configurations.

During a progress bar displaying step 412, an embodiment displays to a user a single progress bar 218 during the entire installation of a multi-application customization 136, as opposed to displaying individual progress bars for each of the multi-application customization's constituent customizations 206.

During an add/remove entry displaying step 414, an embodiment displays to a user a single entry 416 in an add/remove program control 220, corresponding to the entire multi-application customization, as opposed to displaying individual entries for each of the multi-application customization's constituent customizations 206.

During a trust using step 418, an embodiment uses a single trust decision 224 for the entire multi-application customization 136, as opposed to using individual trust decisions for each of the multi-application customization's constituent customizations 206. For example, an embodiment may perform using step 418 by making a single trust decision for the entire multi-application customization 136 during installation of the multi-application customization 136 on a user node computer system 102. Likewise, an embodiment may perform using step 418 by checking a single trust decision for the entire multi-application customization 136 before allowing the multi-application customization 136 to run on a user node computer system 102.

During a storing step 420, an embodiment stores all constituent customizations 206 of a multi-application customization 136 in a single directory 226, as opposed to storing each of the customizations 206 in its own dedicated directory. In some embodiments in some configurations, the directory 226 is an obfuscated directory.

During a version confirming step 422, an embodiment confirms that requirement(s) regarding customization version(s) 424 are satisfied, using version info 212 embedded in or otherwise associated (e.g., by a registry 124) with the customization(s) 206. For example, lock-step version control may be enforced using version confirming step 422.

During a deployment manifest invoking step 426, an embodiment invokes a deployment manifest 208, which may be a standard deployment manifest 208 or an enhanced deployment manifest 208, depending on the embodiment and configuration involved. Invocation 426 may include, for example, receiving a customization URL 304 or a customized document URL 308, locating the file identified in the URL, reading that file, and parsing the contents of that file, e.g., using at least one ID 210 to identify one or more application manifests 202 listed in the deployment manifest.

During an application manifest invoking step 428, an embodiment invokes an application manifest 202, which may be a standard application manifest 202 or an enhanced application manifest 202, depending on the embodiment and configuration involved. Invocation 428 may include, for example, receiving an application manifest ID 210 obtained from a deployment manifest 208 or a registry when an add-in is being loaded, locating the file identified in the application manifest ID, reading that file, and parsing the contents of that file, e.g., using at least one entry 204 to identify one or more customizations 206 listed in the application manifest.

During a multi-application customization updating step 430, an embodiment updates one or more customizations 206 of a multi-application customization 136, e.g., by replacing customization code on the user node computer system 102. In some embodiments and configurations, updating step 430 may involve modifying an application manifest 202 and/or a deployment manifest 208 to include/exclude customizations 206 as part of the multi-application customization 136. In some embodiments, a runtime provides a dialog or other prompt to have a user restart applications 120 after an update 430.

During a solution running step 432, an embodiment executes a multi-project solution 134 (also known as a multi-application customization 136) on a user node. The multiple applications 120 and their respective customizations 206 may be run in parallel, in sequence, or both, provided that the user is given a view 132 consistent with the bundling and desired interactions of the individual customizations 206. Merely copying data from one application to another, e.g., by manual cut-and-paste, does not constitute running step 432, when the respective applications lack coordinated customizations as discussed herein.

Some embodiments include a method for providing a multi-application customization 136 to a user node computer system 102 of a computer network. The method includes a runtime 122 at the user node receiving 402 a single-action (e.g., one-click/one key-press) user request 404 to run a multi-application customization. The runtime receives 406, from a remote node 216 of the computer network, in response to the single-action user request, a first customization 206 which extends a first application 120 previously installed on the user node. The runtime also receives 406, from the same or another remote node 216, in response to the same single-action user request 404, a second customization 206 which extends a second application 120 previously installed on the user node. That is, the customizations are downloaded in response to the user request, but the underlying applications are already present on the user node. The user invokes the application, which in turn loads the customization. The runtime runs 432 the previously installed applications at the user node with the respective customizations. In some cases, the system confirms 422 that the customizations are lock-step versions before running the installed applications with the respective customizations.

Some embodiments take particular steps to provide a user 104 with a view 132 in which the multi-application customization 136 is perceived as a single unitary solution rather than being presented to users as a set of customizations. For example, in some embodiments, the user node displays 412 a single progress update bar 218 for the multi-application customization in response to the single-action user request, as opposed to displaying individual progress bars for each customization. In some embodiments, the user node displays 414 a single entry 416 for the multi-application customization in a control 220 for adding and removing programs, as opposed to displaying individual entries for each customization. In some embodiments, a security control 222 of the user node kernel and/or runtime makes a single trust decision 224 regarding the multi-application customization, as opposed to making individual trust decisions for each customization. In some embodiments, all customizations 206 received in response to the single-action user request are stored 420 in a single directory 226 on the user node without using individual respective directories for each customization.

In some embodiments, the single-action user request to run a multi-application customization invokes 428 an enhanced application manifest, namely, an application manifest which contains multiple entry points, including an entry 204 for each customization 206 of the multi-application customization. Some methods transform a standard application manifest by adding additional entry(ies) 204 to thereby form an enhanced application manifest. In some, the single-action user request invokes 426 an enhanced deployment manifest, namely, one which contains multiple application manifest IDs 210, including an ID for each application manifest of the multi-application customization. Some methods transform a standard deployment manifest by adding additional ID(s) 210 to form an enhanced deployment manifest. Some embodiments use both an enhanced application manifest and an enhanced deployment manifest.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as multi-project solutions, in the form of data 118 and instructions 116, read from a removable medium 114 and/or another source such as a network connection, to form a configured medium. The configured memory 112 is capable of causing a computer system to perform method steps for providing a multi-application customization by transforming memory configuration(s), a network, and/or manifest(s) as disclosed herein. FIGS. 1 through 4 thus help illustrate configured storage media embodiments and method embodiments, as well as system and method embodiments. In particular, any of the method steps illustrated in FIG. 4, or otherwise taught herein, may be used to help configure a storage medium to form a configured medium embodiment.

Some embodiments provide a computer-readable medium 114 configured with data 118 and instructions 116 for performing a method for deploying a multi-application customization 136 at a user node computer system 102 of a computer network. The method includes receiving 406 from a remote node 216 of the computer network a multi-application customization 136 which includes a plurality of customizations 206 that collectively extend a plurality of applications 120 previously installed on the user node. The method may also include steps such as displaying 414 a single entry for the entire multi-application customization in a user node control for adding and removing programs, checking 418 a single trust decision for the entire multi-application customization, storing 420 the entire multi-application customization in a single obfuscated folder of the user node, and/or displaying 412 a single progress update bar for the entire multi-application customization as the multi-application customization is received and installed on the user node.

Some methods include updating 430 a previously installed version of the multi-application customization by modifying at least one of its customizations 206 on the user node. Updating 430 may leave unchanged the set of customized applications 120 referenced in the multi-application customization 136, but in some cases that set of applications may also change. For example, an application 120 which was customized by the multi-application customization 136 before the updating step 430 might no longer be customized by the multi-application customization after the updating step. Similarly, an application 120 which was not customized by the multi-application customization before the updating step 430 could be customized by the multi-application customization after the updating step.

Implementation Considerations

Embodiments discussed herein can be implemented in various ways. Some possible implementations involve Microsoft ClickOnce™ deployment technology. Additional information and examples are provided below, with the understanding that a given embodiment will not necessarily contain every detail of a given example.

Some contemplated implementations use a single ClickOnce™ deployment manifest 208 that points to a single ClickOnce™ application manifest 202, so that the ClickOnce™ package/assembly 310 can be installed as one entity. The ClickOnce™ application manifest contains entries 204 referring to multiple customizations 206, with each customization identified by a unique identifier. In some embodiments, a multi-application customization deployment manifest URL invoked at runtime will contain the appended identifier(s) of the customizations. In some embodiments, a customization ID is used only when a customization is being loaded.

A ClickOnce™ application manifest contains information about the customization that is being deployed, such as information about the application being deployed, the application's prerequisites, the assemblies associated with the application, and metadata such as the update interval. To support multiple customizations, an enhanced application manifest can specify more than one set of EntryPoints (an example of an entry 204). An EntryPoint refers to the main executable or dynamically linked library (DLL) from which the customization can be invoked. Consistent with an updated schema for the application manifest, each EntryPoint has an identifier string (e.g. "OutlookAddin1") that is unique within the application manifest.

A ClickOnce™ deployment manifest contains information about the deployment, such as the publisher signature and product name. The deployment manifest points to the application manifest. End users can install a ClickOnce™-deployed application by invoking the deployment manifest. When a VSTO customization is installed, it registers itself with the host Microsoft Office™ application, such as Microsoft Word™, Microsoft Excel®, or another application 120. This registration is done by making a registry entry under the Office™ registry hive for add-in customizations, or by adding a property to the document or document customizations. The registry key or document property point to the URL of the ClickOnce™ deployment manifest. To differentiate between the different customizations that are part of the same ClickOnce™ multi-application customization 136 the manifest URL is modified so that it also contains the EntryPoint identifier specified for each customization in the application manifest. To identify an individual customization that needs to be invoked the manifest URL will look like the following, for example:

http://servername/deployment.vsto|id=OutlookAddIn1

The manifest URL is followed by a pipe operator followed by a name=value pair which specifies the EntryPoint for a particular customization. In some alternate embodiments, name-value pairs are specified in a different format, e.g., as multiple custom properties on a document such as a Microsoft Word™ document or a Microsoft Excel® document.

With regard to changing multi-project solution composition and getting those changes through updates, in some embodiments add-ins or document customizations can be added or removed as part of an update 430. If the composition of the multi-project solution changes across various versions, then users will automatically get the changes through updates. The VSTO runtime will create/delete or modify the add-in registration keys with each update so that any changes made to the multi-project solution's composition will also be reflected. If an add-in was added as part of an update then the VSTO runtime will add the registry key 302 for the appropriate Office™ application. Similarly, if an add-in was removed then its corresponding registry key will be removed. If an add-in's properties were changed (e.g., FriendlyName/Description) then the corresponding changes will be applied to the registry key.

In some embodiments, a multi-project solution will target just one release of an application bundle, e.g., Microsoft Office™ 2007 software, as opposed to another Microsoft Office™ release, but it could be that the constituent add-ins were originally targeting different releases.

Version controls may be exercised when customizations 206 that specifically target a 64-bit platform, for example, are bundled with 32-bit targeted customizations 206.

In some embodiments, VSTO solutions that are part of a multi-project solution can also play another role, as individual solutions. Care is taken to avoid registry key name clashes, e.g., by using different names for customizations when they are part of a multi-project solution than when they are not. Suppose a developer has published three add-ins individually, in addition to publishing them as part of a multi-project solution. Users can install them as individual add-ins (individual role), and/or as a group (multi-project solution role). The individual add-in(s) will exist side by side with the add-ins that were installed as part of the multi-application customization. If the user tries to install an individual add-in separately from the multi-project solution, then some embodiments require a separate trust decision for each role played by the customization. Some embodiments do not use different registry keys for different roles; the last role registered is the only role recognized by the runtime.

In some embodiments, an update 430 may involve a rollback. As part of a server side rollback, an older version of a customization 206 will be pulled down to the user node when the deployment manifest points to such a previous version. This may be done in a lock-step manner.

With regard to an uninstall, when a user instructs the add/remove control 220 to uninstall a multi-application customization, and the user node is configured with different versions of the runtime 122, then in some embodiments whichever version of the runtime was used to install the multi-application customization is also used to uninstall it. In some embodiments, runtimes are backwards compatible. Thus, if a customization was installed with version X of the runtime, and version Y is later installed, when the customization is uninstalled the most recent version (Version Y) of the runtime will be used to uninstall it.

In some embodiments, a VSTO runtime will read/install and uninstall multiple VSTO solutions as one unit, namely, as a multi-project solution. A multi-project solution can contain multiple VSTO add-ins as well as document solutions. The add-ins and documents could be for the same Office™ application 120 or different Office™ applications. A user needs to make only one trust decision to trust all solutions present in a multi-project solution. A solution installer installs the multi-project solution as one solution from the user's perspective. For example, even though multiple add-ins are installed, only one name (that of the multi-project solution) is displayed, and the progress bar indicates the installation progress of the entire solution rather than showing individual add-ins being installed. In some embodiments, all VSTO solutions present in a multi-project solution are updated at the same time in a lock-step manner, e.g., if the multi-project solution updates from V1 to V2 then all individual solutions are also updated to V2 and no V1 component is allowed to run. Other aspects discussed above may also be part of a VSTO implementation, e.g., a single add/remove control entry, automatic updates to the composition of a multi-project solution changes across various versions, and so on. With regards to compatibility, a runtime 122 may be made resilient to features that have not been introduced yet, e.g., a VSTO runtime can ignore tags that it doesn't recognize so that it doesn't crash or block the installation of a solution that was made to target a later version of the VSTO runtime.

In some embodiments, multiple customizations in a project are associated at the level of a deployment manifest; a deployment manifest links to multiple application manifests. This approach would require changes to at least the ClickOnce™ code. In other embodiments, association occurs at the level of an application manifest; an application manifest has multiple customizations in it.

In some embodiments, an application manifest can specify more than one set of EntryPoints. Each EntryPoint has an identifier (e.g. "OutlookAddin1") unique within the project. Those EntryPoint identifiers are encoded in the manifest registry value in order for a VSTO runtime to distinguish which add-in Office™ code tries to instantiate.

Some embodiments use syntax like the following:
http://lob/apps/lob1.vsto|#OutlookAddin1

That is, one prepends an id with pipe and hash symbols. However, to allow other parameters to be encoded in that line, some embodiments use a different syntax:
http://lob/apps/lob1.vsto|id=OutlookAddin1

That is, one prepends an id with "id=". The equals symbol "=" cannot be used in identifiers and cannot be used in GUIDs, so its appearance in the part of the string separated by the pipe symbol clearly shows that this part needs to be interpreted as the name=value pair.

In some embodiments, compatibility is supported by providing code which parses different versions of manifests, that is, code which recognizes different manifest schemas when forming a manifest object model. Some embodiments use an XML schema such as the following to accommodate enhanced application manifest functionality. The first part of the schema is largely standard:

```
<?xml version="1.0" encoding="utf-8"?>
<xs:schema xmlns:asmv2="urn:schemas-microsoft-com:asm.v2"
    xmlns:vstav3="urn:schemas-microsoft-com:vsta.v3"
    attributeFormDefault="unqualified"
    elementFormDefault="qualified"
    targetNamespace="urn:schemas-microsoft-com:vsta.v3"
    xmlns:xs="http://www.w3.org/2001/XMLSchema">
    <xs:import namespace="urn:schemas-microsoft-com:asm.v2"
    schemaLocation="assemblyIdentity.xsd" />
    <xs:element name="addIn">
      <xs:complexType>
        <xs:sequence>
          <xs:element name="entryPointsCollection"
    type="vstav3:entryPointsCollection" minOccurs="1"
    maxOccurs="1"/>
          <xs:element name="update" type="vstav3:update"
    maxOccurs="1" minOccurs="1"/>
          <xs:element name="application"
    type="vstav3:application" maxOccurs="1" minOccurs="0"/>
        </xs:sequence>
      </xs:complexType>
    </xs:element>
    <xs:simpleType name="IntervalUnit">
      <xs:restriction base="xs:string">
        <xs:enumeration value="days" />
        <xs:enumeration value="hours" />
        <xs:enumeration value="weeks" />
      </xs:restriction>
    </xs:simpleType>
```

However, the entryPointsCollection type has been added to support multi-project solutions. The entryPointsCollection type is defined in the schema as follows:

```
<xs:complexType name="entryPointsCollection">
  <xs:sequence>
    <xs:element name="entryPoints"
type="vstav3:entryPoints" minOccurs="1"
maxOccurs="unbounded"/>
  </xs:sequence>
</xs:complexType>
<xs:complexType name="entryPoints">
  <xs:sequence>
    <xs:element maxOccurs="unbounded" name="entryPoint">
      <xs:complexType mixed="true">
        <xs:sequence minOccurs="1" maxOccurs="1">
          <xs:element ref="asmv2:assemblyIdentity" />
        </xs:sequence>
        <xs:attribute name="class" type="xs:string"
use="required" />
        <xs:attribute name="contract" type="xs:string"
use="optional" />
      </xs:complexType>
    </xs:element>
  </xs:sequence>
  <xs:attribute name="id" type="xs:string"
use="required"/>
</xs:complexType>
```

The remainder of the schema follows:

```
<xs:complexType name="update">
  <xs:sequence>
    <xs:element name="expiration" maxOccurs="1"
minOccurs="0">
      <xs:complexType>
        <xs:attribute name="maximumAge"
type="xs:unsignedInt" use="required" />
        <xs:attribute name="unit"
type="vstav3:IntervalUnit" use="required" />
      </xs:complexType>
    </xs:element>
  </xs:sequence>
  <xs:attribute name="enabled" type="xs:boolean"
use="required" />
</xs:complexType>
<xs:complexType name="application">
  <xs:sequence>
    <xs:any minOccurs="0" namespace="##other"
processContents="skip" />
  </xs:sequence>
</xs:complexType>
</xs:schema>
```

In some embodiments, a VSTO part of the application manifest uses a vsto.v4.xsd schema and newly created namespace vstov4=urn:schemas-microsoft-com:vsto.v4, including the line:

<xs:element name="customizations" type="tns:customizations"/>

The following schema listing provides an additional example:

```
<vstav3:addIn xmlns:vstav3="urn:schemas-microsoft-
com:vsta.v3" xmlns="urn:schemas-microsoft-com:asm.v2">
  <vstav3:entryPointsCollection>
    <vstav3:entryPoints id="OutlookAddin1">
      <vstav3:entryPoint
class="OutlookAddin1.ThisApplication">
        <assemblyIdentity name="OutlookAddin1"
version="1.0.0.0" language="neutral"
processorArchitecture="msil" />
      </vstav3:entryPoint>
    </vstav3:entryPoints>
    <vstav3:entryPoints id="ExcelAddin2">
      <vstav3:entryPoint
class="ExcelAddin2.ThisApplication">
        <assemblyIdentity name="ExcelAddin2"
version="1.0.0.0" language="neutral"
processorArchitecture="msil" />
      </vstav3:entryPoint>
    </vstav3:entryPoints>
  </vstav3:entryPointsCollection>
```

-continued

```
    <vstav3:update enabled="true">
        <vstav3:expiration maximumAge="15" unit="weeks" />
    </vstav3:update>
    <vstav3:application>
<vstov4:customizations xmlns:vstov4="urn:schemas-microsoft-
   com:vsto.v4">
    <vstov4:customization id="OutlookAddin1">
        <vstov4:appAddIn application="Outlook" loadBehavior="3"
keyName="key name">
        <vstov4:friendlyName>friendly
name</vstov4:friendlyName>
            <vstov4:description>description</vstov4:description>
        </vstov4:appAddIn>
    </vstov4:customization>
    <vstov4:customization id="ExcelAddin2">
        <vstov4:appAddIn application="Excel" loadBehavior="3"
keyName="key name">
        <vstov4:friendlyName>friendly
name</vstov4:friendlyName>
            <vstov4:description>description</vstov4:description>
        </vstov4:appAddIn>
    </vstov4:customization>
</vstov4:customizations>
    </vstav3:application>
</vstav3:addIn>
```

In some embodiments, a Microsoft Visual Studio® Tools for Applications (VSTA) manifest AddIn element can consist of a single entryPoints element or of a single entryPointsCollection element which can have one or many entryPoints elements. In some schemas all entryPoints elements must have an id attribute, but the id can be an empty string in the case of a single customization manifest. In some embodiments, a Microsoft Visual Studio® Tools for Office (VSTO) manifest application element can consist of a single customization element or a single customizations element which can have one or many customization elements. In some schemas all customization elements must have an id attribute, but it can be an empty string in case it is single customization manifest.

Some embodiments use a different manifest file name extension to differentiate between single project solutions and multi-project solutions.

Some embodiments use xs:any tags in schemas, to allow extensibility of manifests by providing an ability to add previously undefined elements to an existing manifest. If new elements are added to the xs:any sections, a properly written XML parser will ignore those values when their new functionality is not supported.

In some embodiments, multiple add-ins within a single multi-project solution share a library or other component. If one of these add-ins is running when an update to the shared component occurs, then the updated version of the solution will use the updated version of the shared component, and the old version of the solution will continue to use the old component.

In some embodiments, multiple add-ins share the same data folder in a runtime cache. Developers are responsible for ensuring data consistency if two add-ins try to access the same file.

In some embodiments, a solution has a flat space of add-ins, so name clashes are possible, e.g., if multiple add-ins use app.config. Naming conventions can be used to avoid clashes, e.g., each config file can be named assembly.dll.config so that there are no conflicts. This is a runtime only consideration, and developers can make sure the configs are unique.

In some embodiments, a multi-project solution is signed with one security certificate which is valid for all individual solutions present in the multi-project solution. Only one inclusion list entry is needed to trust all solutions inside a multi-project solution.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 4 also help describe configured media, and help describe the operation of systems and manufactures like those discussed in connection with FIGS. 1 through 3. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for providing a multi-application customization to a user node of a computer network, the method comprising the steps of:

a user node receiving a single-action user request to run a multi-application customization, the multi-application customization including interdependent customizations of multiple applications, the interdependent customizations when installed forming a single solution when viewed from an end-user perspective;

the user node receiving, from a remote node of the computer network, in response to the single-action user request, a first customization of the multi-application customization which extends a first application previously installed on the user node;

the user node also receiving, from the same or another remote node, in response to the same single-action user request, a second customization of the multi-application customization which extends a second application previously installed on the user node; and the user node running the previously installed applications at the user node with the respective customizations of the multi-application customization.

2. The method of claim 1, wherein the user node displays a single progress update bar for the multi-application customization in response to the single-action user request, as opposed to displaying individual progress bars for each customization.

3. The method of claim 1, wherein the user node displays a single entry for the multi-application customization in a control for adding and removing programs, as opposed to displaying individual entries for each customization.

4. The method of claim 1, wherein a security control of the user node makes a single trust decision regarding the multi-application customization, as opposed to making individual trust decisions for each customization.

5. The method of claim 1, wherein both customizations received in response to the single-action user request are stored in a single directory on the user node without using individual respective directories for each customization.

6. The method of claim 1, further comprising confirming that the customizations are lock-step versions before running the installed applications with the respective customizations.

7. The method of claim 1, wherein the single-action user request to run a multi-application customization invokes an application manifest which contains multiple entry points, including an entry point for each customization.

8. A computer-readable medium configured with data and instructions for performing a method for deploying a multi-application customization at a user node of a computer network, the method comprising the steps of:

receiving from a remote node of the computer network, in response to a single-action user request, a multi-application customization which includes a plurality of interdependent customizations that collectively extend a plurality of applications previously installed on the user node that with the customizations form a single solution when viewed from an end-user perspective; and displaying a single entry for the entire multi-application customization in a user node control for adding and removing programs; and running the previously installed applications with the customizations of the multi-application customization.

9. The configured medium of claim 8, wherein the method further comprises checking a single trust decision for the entire multi-application customization.

10. The configured medium of claim 8, wherein the method further comprises storing the entire multi-application customization in a single obfuscated folder of the user node.

11. The configured medium of claim 8, wherein the method further comprises displaying a single progress update bar for the entire multi-application customization as the multi-application customization is received and installed on the user node.

12. The configured medium of claim 8, wherein the method further comprises updating a previously installed version of the multi-application customization by modifying at least one customization on the user node.

13. The configured medium of claim 12, wherein at least one of the following conditions is true:

an application which was customized by the multi-application customization before the updating step is no longer customized by the multi-application customization after the updating step;

an application which was not customized by the multi-application customization before the updating step is customized by the multi-application customization after the updating step.

14. A user node computer system in a computer network configured by multi-application customization deployment code, the user node computer system comprising:

a logical processor; and a memory in operable communication with the logical processor, the memory configured with a plurality of installed applications, the memory further configured by the user node computer system performing with the deployment code a method having at least the following steps:

receiving a single-action user request to run a multi-application customization; receiving from a remote node of the computer network a multi-application customization which includes a plurality of interdependent customizations that collectively extend a plurality of previously installed applications; and installing the interdependent customizations on the user node computer system as a single solution when viewed from an end-user perspective; and running the previously installed applications with the customizations of the multi-application customization.

15. The user node computer system of claim 14, in combination with an enhanced application manifest, namely, an application manifest that contains multiple entry points corresponding to respective multiple customizations of the multi-application customization.

16. The user node computer system of claim 14, in combination with an enhanced deployment manifest, namely, a deployment manifest which identifies multiple application manifests that each have a respective entry point for one of the customizations of the multi-application customization.

17. The user node computer system of claim 14, wherein the method displays a single progress update bar for the multi-application customization, as opposed to displaying individual progress bars for each customization.

18. The user node computer system of claim 14, wherein the method displays a single entry for the multi-application customization in a control for adding and removing programs, as opposed to displaying individual entries for each customization.

19. The user node computer system of claim 14, wherein the method makes a single trust decision for the multi-application customization, as opposed to making individual trust decisions for each customization.

20. The user node computer system of claim 14, wherein the method customizes at least two of the following previously installed applications:

a word processing application, a spreadsheet application, an email application, a slide presentation graphics application, a database application, a project management application, an accounts management application, a collaborative workspace application, a graphics visualization application.

* * * * *